US012793454B2

(12) United States Patent
Fu et al.

(10) Patent No.: US 12,793,454 B2
(45) Date of Patent: Nov. 10, 2026

(54) IMAGE REPAIR OF CAPTURED DOCUMENT IMAGES FOR DOCUMENT IMAGE SUBMISSIONS USING A GENERATIVE ARTIFICIAL INTELLIGENCE

(71) Applicant: PAYPAL, INC., San Jose, CA (US)

(72) Inventors: Weilin Fu, Shanghai (CN); Chao Wang, Shanghai (CN); Ke Jin, Shanghai (CN); Tian Peng, Shanghai (CN); Wei Sun, Singapore (SG); Yanjun Shen, Shanghai (CN)

(73) Assignee: PAYPAL, INC., San Jose, CA (US)

(*) Notice: Subject to any disclaimer, the term of this patent is extended or adjusted under 35 U.S.C. 154(b) by 286 days.

(21) Appl. No.: 18/591,872

(22) Filed: Feb. 29, 2024

(65) Prior Publication Data

US 2025/0278952 A1 Sep. 4, 2025

(51) Int. Cl.

| | |
|---|---|
| ***G06V 30/12*** | (2022.01) |
| ***G06V 10/82*** | (2022.01) |
| ***G06V 10/98*** | (2022.01) |
| ***G06V 30/16*** | (2022.01) |
| ***G06V 30/19*** | (2022.01) |
| ***G06V 30/41*** | (2022.01) |

(52) U.S. Cl.

CPC ............ *G06V 30/133* (2022.01); *G06V 10/82* (2022.01); *G06V 30/16* (2022.01); *G06V 30/19147* (2022.01); *G06V 30/41* (2022.01)

(58) Field of Classification Search

USPC .......................................................... 382/154

See application file for complete search history.

(56) References Cited

U.S. PATENT DOCUMENTS

| | | | | |
|---|---|---|---|---|
| 10,685,347 | B1 * | 6/2020 | Edwards | G06F 21/36 |
| 12,367,669 | B2 * | 7/2025 | Wang | G06V 10/82 |
| 2020/0311407 | A1 * | 10/2020 | Nepomniachtchi | G06V 30/40 |

(Continued)

OTHER PUBLICATIONS

Chen, Ying et al., From coarse to fine: Two-stage deep residual attention generative adversarial network for repair of iris textures obscured by eyelids and eyelashes, 2023, iScience, vol. 26, Issue 7 (Year: 2023).*

(Continued)

*Primary Examiner* — Chineyere Wills-Burns
*Assistant Examiner* — Ethan N Wolfson
(74) *Attorney, Agent, or Firm* — Haynes and Boone, LLP

(57) ABSTRACT

There are provided systems and methods for image repair of captured document images for document image submissions using generative artificial intelligence (AI). A service provider, such as an electronic transaction processor for digital transactions, may provide computing services to users, which may be used to engage in interactions with other users and entities including for electronic transaction processing. When utilizing these services, document verification may be required to verify a document. A user may capture an image of a document, such as a driver's license, and an image repair generative AI may determine if image repair may be necessary to improve an image quality of the image. The generative AI may be trained using multiple neural networks to generate and distinguish between different image qualities. The generative AI may therefore generate image data that improves the image quality and allows for verification of content in the image.

20 Claims, 10 Drawing Sheets

(56) References Cited

U.S. PATENT DOCUMENTS

| | | | | |
|---|---|---|---|---|
| 2021/0065337 | A1* | 3/2021 | Bai | G06F 18/2148 |
| 2021/0248463 | A1* | 8/2021 | Sasagawa | G06N 3/08 |
| 2021/0350516 | A1* | 11/2021 | Tang | G06N 3/0464 |
| 2023/0010164 | A1* | 1/2023 | Cowan | G06F 18/214 |
| 2023/0196536 | A1* | 6/2023 | Hwang | G06V 10/82<br>382/112 |
| 2023/0296516 | A1* | 9/2023 | Dutta | G06T 5/60<br>250/459.1 |

OTHER PUBLICATIONS

Isola, Phillip et al. "Image-to-Image Translation with Conditional Adversarial Networks," Berkeley AI Research (BAIR) Laboratory, UC Berkeley, Nov. 26, 2018, 17 pages.

Zhu, Jun-Yan et al. "Unpaired Image-to-Image Translation using Cycle-Consistent Adversarial Networks," Berkeley AI Research (BAIR) laboratory, UC Berkeley, Aug. 24, 2020, 18 pages.

* cited by examiner

IMAGE REPAIR OF CAPTURED DOCUMENT IMAGES FOR DOCUMENT IMAGE SUBMISSIONS USING A GENERATIVE ARTIFICIAL INTELLIGENCE

TECHNICAL FIELD

The present application generally relates to image data processing and more particularly to utilizing machine learning (ML) models and neural networks (NNs) for identifying low-quality images and repairing such images for data review and extraction.

BACKGROUND

Service providers may provide computing services to customers, clients, and users through computing systems and services that provide platforms, websites, applications, and interfaces for interactions. In these service provider's systems, images of documents may be submitted for proof of identification, validity, possession, authentication, and the like, as well as image data extraction, such as user images, text, and the like. The service providers may provide document image submission systems and processes, which allow users to capture an image or the like of a physical document and upload that image for processing. However, processing may take a significant amount of time and results may not be immediately provided to the user where the document may be required to be parsed, processed, and analyzed, such as by artificial intelligence (AI) systems, such as machine learning (ML) models, neural networks (NNs), and the like for image and/or text data identification, extraction, and processing. Further, document verification pass rates from images may be significantly impacted by quality of document images that are uploaded by customers.

Low-quality document images (e.g., having blur, having glares or other unwanted light or image effect sources, of low resolution, missing key information, and other issues that prevent the system from accurately processing the image) may lead to a low pass rate of document image submissions with an overall document verification process. This low pass rate may result in a high cost to service providers when providing document verification services (e.g., an increased cost, loss of customer base, lost transaction or other payments, slow or delayed payments and transaction processing, additional computing resource usage, etc.), as well as a bad user experience, such as requiring the user to recapture the document and resubmit the image. These bad user verification experiences may cause users to drop off and giving up using service provider computing services and resources. As such, it is desirable to provide accurate and precise image quality assessments of document images in real-time or near real-time to allow for user corrections and resubmissions when images may be of poor or inadequate quality.

Figure 1:
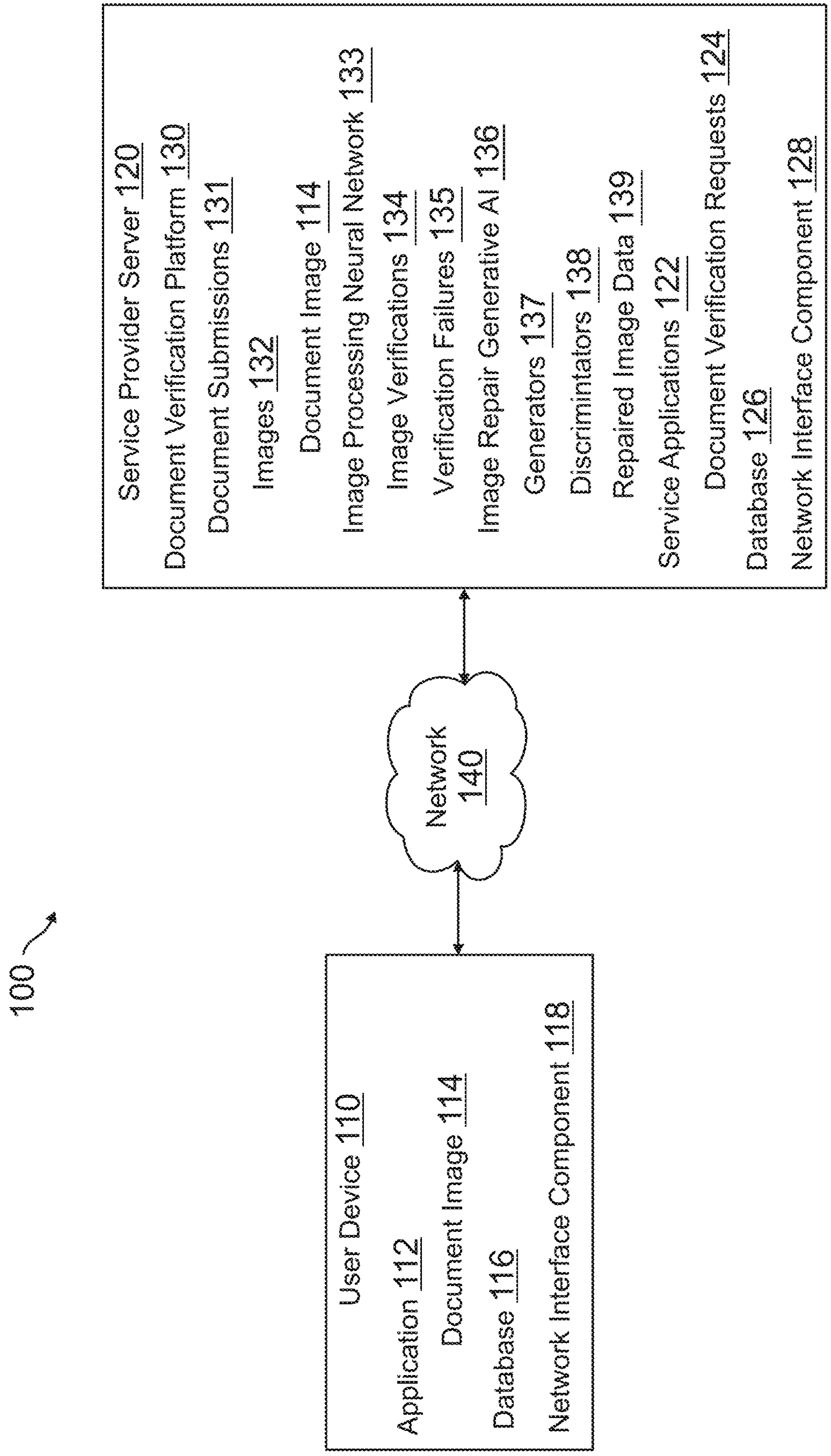
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for image repair of captured document images for document image submissions using a generative artificial intelligence (AI). Systems suitable for practicing methods of the present disclosure are also provided.

In computing systems of service providers, computing services may be used for electronic transaction processing, account creation and management, payment and transfer services, customer relationship management (CRM) systems that provide assistance, reporting, sales, and the like, and other online digital interactions. In this regard, computing services and systems may provide computing services to users through various platforms that may require users to verify their identity, authenticate themselves, validate their information, provide supporting documentation for service provision and/or proof of an event, and/or otherwise submit documents and documentation to the service provider for analysis. Such, data may be provided through uploads to different platforms and websites or applications, as well as through communications via an email channel, a digital alert channel, a text message channel, a push notification channel, an instant message channel, or other messaging channel. In this regard, paper or physical documents may be scanned, imaged, or otherwise converted to digital form by user devices, such as mobile phones and cameras. However, document verification pass rates may be significantly impacted by the quality of document images that are uploaded by customers and other users. Documents may include imaging artifacts including blur, glare, low resolution, missing fields or improperly captured images and the like that leads to a low pass rate, a low verification rate, and/or an inaccurate verification determination, as well as bad customer experience and customer drop-off or turnover.

Thus, when providing these computing services that require document verification, the service provider's system and architecture may implement processes that provide image repair of document images having poor or low-quality, such as through a multiple NN or other ML model framework and pipeline, executed by one or more processors and/or engines. In this regard, when document image submissions have image quality issues (e.g., resolution, glare, blurring, etc.) the prevents, inhibits, or otherwise unfavorably affects document verification (e.g., by failing document verification, requiring an image or data resubmission, preventing or slowing data extraction, requiring manual review, etc.), a service provider may utilize an image repair and correction framework to improve image quality of document images for document verification processes, thereby improving accuracies, speeds, and efficiencies in processing documents for verification and authorization. Low-quality document images are a large problem during document verification and, as such, a GAN (Generative Adversarial Networks)-based model, in one embodiment, is used to improve document image quality, which may be particularly effective for dark and/or blurred document images. The GAN or other generative AI may repair content or data in the image by providing image repair data for fields that are blurry or unable to be viewed, processed, and/or have data extracted on the image. This allows for conversion from a poor- or low-quality image to a higher quality image that enables a more accurate and efficient document verification, data extraction, and/or document review (e.g., by real users or automated processes and intelligent models). As such, using this model, the conversion rate may be improved with better optical character recognition (OCR) extraction results for verification of document images.

Further, the service provider may provide information, messages, and the like regarding document image quality, repaired document images, and/or repair data or suggestions for document images, which may include why documents may fail document verification and/or where and why a document image may be repaired to fix, replace, or otherwise adjust issues in image quality in the originally submitted image. This may include fixing, correcting, adjusting, or adding missing or insufficient information and/or unreadable or unextractable image data, as well as suggestions on how to repair and/or recapture images of documents to improve verification success. As such, automated image repair may be performed to fix and complete image verification processes without or with minimal user efforts, thereby reducing unnecessary processing of poor or bad quality images, wasted resources processing such images, additional submission requests from users and other system inefficiencies caused by low-quality image use for document verification.

Image verification may be needed before a service provider provides computing services to users, including those computing services associated with electronic transaction processing. For example, an online transaction processor (e.g., PayPal®) may allow merchants, users, and other entities to process transactions, provide payments, transfer funds, or otherwise engage in computing services. In other examples, other service providers may also or instead provide computing services for social networking, microblogging, media sharing, messaging, business and consumer platforms, etc. In order to utilize the computing services of a service provider, an account with the service provider may be established by providing account details, such as a login, password (or other authentication credential, such as a biometric fingerprint, retinal scan, etc.), identification information to establish the account (e.g., personal information for a user, business or merchant information for an entity, or other types of identification information including a name, address, and/or other information), and/or financial information.

All of these interactions may generate and/or process data, which may require verification of documents in possession of users, including text and/or image documents, forms, cards, and the like. In order to provide for image repair and improvement to image quality for images taken of documents being verified, the service provider may provide, in one embodiment, an NN or other ML framework implementing NNs and other ML models, techniques, and algorithms for image data processing including object detections and image data quality assessment and improvement through generative AI. Generative AI algorithms can be used to create new content, such as images, videos, and text. To provide image repair, a service provider may train and configure a generative AI, a NN, or other ML or AI model to learn from both high-quality documents and low-quality documents and generate higher quality repaired document images, such as from blurred or dark document images of lower quality, where quality may describe how readable a document is in the image, whether data can be extracted from the document in the image, or more generally how easily or possible it is to verify the document in the image via manual review and efforts and/or automated processes and systems. With the GAN described herein, a framework may be established to train and utilize the model for image repair and image quality improvements or increases, such as by creating new output from the pattern found in the training dataset.

For example, a GAN may generate data that is similar to real data for the purpose of document quality repairing and to recover the low-quality image and data in document fields of the image so that the data may be accurately extracted. As such, a trained GAN may generate a new document image, portions of a document image, and/or new or reconstructed document data or content in an image, such as through image repair data that may correspond to real and/or procedurally generated data that is used in place of or with existing image data to improve image quality for one or more document fields present in an image. Such data may correspond to the source data on the document as closely as possible based on training and inferences by the trained generative AI. A GAN may be a deep neural network architecture made up of two networks, a generator and a discriminator. The generator learns to generate plausible data from input data, such as real image data of a higher quality from an input low-quality image. The generated instances become negative training examples for the discriminator. The discriminator may learn to distinguish the generator's fake data from real data. The discriminator penalizes the generator for producing implausible results, and therefore allows the generator to improve learning for what would be "real" data or the data that is plausible and would be apparent from the low-quality image.

When training begins, the generator may attempt to produce real data but may start with poor quality data and/or fake data that is not plausible as the real data in the image. The discriminator learns to tell if the data is low-quality, bad, or implausible to be real data. As training progresses, the generator gets closer to producing output that can fool the discriminator and therefore provide real image data. As such, once the generator is well trained (e.g., producing outputs within a threshold accuracy), the discriminator may perform worse at telling the difference between real and fake data from the generator, and the discriminator's accuracy decreases as the generator improves at quality image generation and/or improvement (e.g., image repair of low-quality images). The same training may also be provided in a "reverse" manner, as described below, where low-quality images may be generated from high-quality images, and the discriminator used to distinguish differences between high- and low-quality images in a corresponding but reversed manner.

After the training is completed, the generator may then be used to generate the real data and other content plausible for the image, such as to recover the original document and/or data in fields of the original document from the low-quality images of the document. First, the service provider and/or data scientists may create a data set or argument, which may correspond to image training data having image pairs for good-bad or high-low-quality document image pairs. The image pairs may be created using various algorithms for adding artifacts, blurring, or other effects to images, such as a random shadow, random crop, random shaped reflection, random shaped noise, random distortions, etc. For each data set, there is one high-quality image and one low-quality image (generated by augmentation).

For example, low-quality images may be generated by applying many image operations on a high-quality image in a sequence, for example: A: adding random amount of motion blur (to simulate camera shaking), B: rescaling-scale up image size by 2 times and then scale down to original size (to simulate data loss of various image file manipulation), C: Adding random amount of ISO noise, and D: reducing illumination. The operation sequence may be ABACBD or various permutations of ordering of these operations in a sequence. This may be referred to as higher order augmentation, which can make the low-quality effect more "real," and higher order augmentation may significantly help the network to converge and gain better results.

Next, two Pix2Pix models or a similar type of a GAN may be trained with paired Images. In Pix2Pix or similar model A, a prepared low-quality document may be used as the input. The generator generates a high-quality image of the document using the input. This generated high-quality image of the document is fed along with the initial high-quality image to the discriminator, which learns the differences and loss between the two images and improves the model A of the generator to be more accurate and similar to the actual high-quality image.

In Pix2Pix or similar model B, the NN or other ML model may be trained in a reversed manner, for example, by providing the prepared high-quality document as the input and generating a low-quality image of the document. This generated low-quality image may be fed along with the initial low-quality to the discriminator, which similarly learns the differences and may retrain the generator of model B to be more accurate when generating the low-quality image. A CycleGAN may be used for model finetuning, which does not require paired training data to further finetune the model with real, original data. In the upper half of the cycle, the generator trained in model A may be used to generate a high-quality image of a document from a live low-quality image. In the bottom half of the cycle, the generator trained in model B may be used to generate a low-quality image of a document from a live high-quality image. Each of the generated and preexisting high-quality and low-quality images may be sent to respective discriminators, where the discriminators learn the differences and keep improving the generators (and, in turn, the discriminators) in this cycle.

By integrating this trained generative AI model and NNs in manual document verification tools, the service provider may generate, determine, and/or provide clearer documents for case and document review, as well as manual verifications. Since the images are more readable, information may be easily located, and the average case handling time could be reduced. Furthermore, repaired documents are also more suitable and/or easier for OCR and other image data extraction, and therefore data may be automatically extracted for automated document verification and/or presentation to manual reviewers. Once sufficiently accurate, low-quality images captured and/or displayed in certain real-time verification scenarios may be used for accurate and more efficient authentication and/or verification. As such, the service provider may lower the bar of good-quality documents, which may allow more customers to submit their document without compromising the pass rate of document verification and possible improving such pass rates. With that, the conversion rate for customers and accounts may be higher and more documents may be more easily verified without multiple data submissions and attempts at processing Further, the image repair may allow the system to indicate the location and identification of quality issues in image data captured of the document with corresponding repair data that may fix such quality issues such that the user capturing the image or another user verifying the image and document (e.g., a reviewer, authorizer, data scientist, or the like) may determine if an image can be repaired, the repair data is correct or likely to be correct, and/or whether the generative AI is behaving correctly. Thus, the service provider's intelligent image quality assessment framework for document submissions may provide guided submissions and image repair data for document verification in a fast and accurate manner that is performed through automated computing systems without manual efforts and intervention. This prevents various image issues from leading to the failure or need for re-execution of a document submission process.

The NN and other ML model framework may also be generalized and customizable for different purposes and uses as required by the service provider for different types of images and/or image repair. For example, in transaction authorization and review, images may be captured of receipts, items and/or item verifications (e.g., SKUs, product or inventory numbers and identifiers, barcodes or QR codes, etc.), purchased items or services (e.g., an image of an item that a user purchased for proof of purchase) and the like. Where images may be of insufficient quality, the framework may provide suggestions and recommendations to repair images and/or may repair those images to supply unreadable data. This can improve operational efficiency and effectiveness by ensuring submitted documents are of sufficient quality and/or readable for users and/or systems performing data extraction. In this manner, the service provider's system for automated image processing may be made more efficient, faster, more accurate, and require less monitoring and manual efforts for document verification.

FIG. 1 is a block diagram of a networked system 100 suitable for implementing the processes described herein, according to an embodiment. As shown, system 100 may comprise a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

FIG. 1 provides an overview of system 100 to implement NNs and/or other ML models used for image repair of image of documents or other content having extractable and/or readable data that may be reconstructed, determined, or procedurally generated. System 100 includes a user device 110 and a service provider server 120 in communication over a network 140. User device 110 may be utilized by a user, customer, or entity to access a computing service or resource provided by service provider server 120, where service provider server 120 may provide various data, operations, and other functions to user device 110 via network 140. In this regard, user device 110 may be used to provide images of documents that are requested to be verified by service provider server 120, which may have quality issues (e.g., low or bad quality) due to glare, image capture, camera deficiencies, camera focus or other capture parameter, document issues or visibility, and the like. As such, service provider server 120 may analyze and process such images to determine whether the images may be repaired by procedurally generating new or additional image and/or document content and data, which may be used for repairing, recapturing, or otherwise remedying such quality issues.

User device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

User device 110 may be implemented as a communication device that may utilize appropriate hardware and software configured for wired and/or wireless communication with service provider server 120 and other devices and/or servers. For example, in one embodiment, user device 110 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

User device 110 of FIG. 1 contains an application 112, a database 116, and a network interface component 118. Application 112 may correspond to executable processes, procedures, and/or applications with associated hardware. In other embodiments, user device 110 may include additional or different modules having specialized hardware and/or software as required.

Application 112 may correspond to one or more processes to execute modules and associated devices of user device 110 to provide a convenient interface to permit a user for user device 110 to utilize services of service provider server 120, including computing services that may include providing and submitting documents for verification via images or other digital copies, as well as responding to document image assessments. Where service provider server 120 may correspond to an online transaction processor, the computing services may include those to enter, view, and/or process transactions, onboard and/or use digital accounts, and the like, which may include providing, verifying, and/or validating documents and other content captured in images by user device 110 and transmitted to service provider server 120. Such images may be provided when engaging in, as well as before or after and in support of, electronic transaction processing or other computing services associated with digital payment accounts, transactions, payments, and/or transfers.

In this regard, application 112 may correspond to specialized hardware and/or software utilized by user device 110 that may provide transaction processing and other computing service usage through a user interface enabling the user to enter and/or view data, input, interactions, and the like for processing. This may be based on a transaction generated by application 112 using a merchant website or seller interaction, or by performing peer-to-peer transfers and payments with merchants and sellers. Application 112 may be associated with account information, user financial information, and/or transaction histories. However, in further embodiments, different services may be provided via application 112, including messaging, social networking, media posting or sharing, microblogging, data browsing and searching, online shopping, and other services available through service provider server 120. Thus, application 112 may also correspond to different service applications and the like that are associated with service provider server 120.

In this regard, when providing document images and other images of objects for verification and approval, application 112 may capture and transmit document image 114 to service provider server 120. Document image 114 may correspond to a document having text, graphics, images, visual content, and the like, which may be processed to assess a quality for submission with a document review, verification, and/or approval process, as well as repair fields, areas, portions, or the like of low or poor quality that inhibits review and processing for document verification, as discussed herein. Service provider server 120 may receive document image 114 with other document submission and/or verification and may process document image 114 to determine whether the underlying document and data can be verified and/or repair areas for verification, as discussed herein.

Thus, application 112 may include processes to capture, load, and/or provide document images for processing by service provider server 120, as well as output document image quality responses, repaired images and/or repair data and suggestions for low-quality images or image portions, and/or recapture suggestions. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 140, including retrieving website information, presenting the website information to the user, and/or communicating information to the website. However, in other embodiments, application 112 may include a dedicated software application of service provider server 120 or other entity (e.g., a merchant) resident on user device 110 (e.g., a mobile application on a mobile device) that is displayable by a graphical user interface (GUI) associated with application 112.

User device 110 may further include database 116 stored on a transitory and/or non-transitory memory of user device 110, which may store various applications and data and be utilized during execution of various modules of user device 110. Database 116 may include, for example, identifiers such as operating system registry entries, cookies associated with application 112, identifiers associated with hardware of user device 110, or other appropriate identifiers, such as identifiers used for payment/user/device authentication or identification, which may be communicated as identifying the user/user device 110 to service provider server 120. Moreover, database 116 may include document image 114, information associated with capture of document image 114, and/or results of document image 114 processing, which may be presented and/or output via application 112.

User device 110 includes at least one network interface component 118 adapted to communicate with other computing devices, servers, and/or service provider server 120. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide computing services, including electronic transaction processing, via network 140. In this regard, service provider server 120 includes one or more processing applications which may be configured to interact with user device 110 to provide data, user interfaces, platforms, operations, and the like for the computing services to user device 110, as well as facilitate image repair using computing systems, including generative AI systems and models. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes a document verification platform 130, service applications 122, a database 126, and a network interface component 128. Document verification platform 130 and service applications 122 may correspond to executable processes, procedures, and/or applications with associated hardware. In other embodiments, service provider server 120 may include additional or different modules having specialized hardware and/or software as required.

Document verification platform 130 may correspond to one or more processes to execute modules and associated specialized hardware of service provider server 120 to provide a platform for analysis of document submissions 131 having images 132 including document image 114 from user device 110. As such, document verification platform 130 may determine a quality of image data for images 132 and whether images 132 are of sufficient quality for document submissions 131 to be properly reviewed, have data extracted for, and/or verified using image processing NN 133, or may require repair using image repair generative AI 136. In this regard, document verification platform 130 may correspond to specialized hardware and/or software used by service provider server 120 to process document submissions 131, such as from document verification request 124 from service applications 122, which may be generated to verify documents and/or content in documents from use of service applications 122. This may be done using an NN or other ML model pipeline and engine that processes images 132 for content, data, and the like in captured documents or other content using an object detection NN and/or object classification NN. In this regard, document verification platform 130 may interact with service application 122 to receive, detect, collect, and/or otherwise determine that document submissions 131 have been provided for verification through document verification requests 124 from a corresponding domain, category, communication channel, or the like. Document verification requests 124 may be provided during use of a computing service and/or after on in conjunction with use, such as to provide a service to users through service applications 122.

In various embodiments, document verification platform 130 includes NNs and ML models that may be used for intelligent decision-making and/or predictive outputs and services, such as during the course of providing document verification and/or document image repair for low or poor document image quality for document image submissions. Thus, image processing NN 133 may provide a predictive output, such as a score, likelihood, probability, or decision, associated with assessment of images 132 for image verifications 134 and/or verification failures 135. When verifying images, image repair may be performed by image repair generative AI 136, which may include NNs for generators 137 and discriminators 138 that output repaired image data 139 using a GAN, CycleGAN, or other generative AI trained on low- and high-quality documents for image repair NNs and ML models of image processing NN 133 and/or image repair generative AI 136 for document verifications and repair may employ a combination of different NNs and ML model algorithms including deep NNs, algorithms, and techniques for object location and classification, as well as image data extraction. Although NN algorithms are discussed herein, it is understood other types of computing systems and models, including NNs, ML models, and AI-driven engines and corresponding algorithms, may also be used.

For example, image processing NN 133 and/or image repair generative AI 136 of document verification platform 130 may include NNs trained for intelligent decision-making and/or predictive outputs (e.g., scoring, comparisons, predictions, decisions, classifications, and the like) for particular uses with computing services provided by service provider server 120 for document or user verification. When generating NNs, NN algorithms and trainers may be used to create NNs, and training data may be processed to generate one or more classifiers that provide recommendations, predictions, or other outputs based on those classifications and NN algorithms. Service provider server 120 may implement one or more NN algorithms to generate different object detection and classification NNs and NN task performances, as well as procedurally generate new and/or predicted data for images and/or image portions of low-quality and/or unreadable or unextractable data in documents captured in images.

When initially configuring NNs using corresponding algorithms, training data may be used to determine input features and utilize those features to generate NN architectures and corresponding NN outputs at an output layer. For example, NNs may include multiple layers, including an input layer, a hidden layer, and an output layer having one or more nodes, however, different layers may also be utilized. As many hidden layers as necessary or appropriate may be utilized. Each node within a layer is connected to a node within an adjacent layer, where a set of input values may be used to generate one or more output values or classifications. Within the input layer, each node may correspond to a distinct attribute or input data type that is used by the NN algorithms using feature or attribute extraction for input data.

Thereafter, the hidden layers may be generated with these attributes and corresponding weights using an NN algorithm, computation, and/or technique. For example, each of the nodes in the hidden layers generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the ML models that provide an output, classification, prediction, or the like. Thus, when the ML models are used to perform a predictive analysis and output, the input may provide a corresponding output based on the classifications trained for the ML models. As many hidden layers and nodes as necessary may be provided and trained, where each hidden layer is interconnected to the previous and next hidden layer and hidden layers are further interconnected to the input layer and output layer, creating a set of neurons of the NNs.

By providing input data, the nodes in the hidden layers may be adjusted such that an optimal output (e.g., a classification) is produced in the output layer. By continuously providing different sets of data and penalizing NNs when the outputs of the NNs are incorrect, the NN algorithms for document verification platform 130 (and specifically, the representations of the nodes in the hidden layers) may be adjusted to improve their performance in data classification. This data classification may correspond to object detection and/or extraction by image processing NN 133 for image verifications 134 and/or verification failures 135. However, other NNs may correspond to generative AIs where their corresponding outputs may correspond to intelligently and/or procedurally generated data, such as image and/or repair data for images of low and/or poor quality where document verification of the document (or other content) in the images may be refused, failed, or denied due to readability or extractability issues. Using the NN algorithms, image processing NN 133 and/or image repair generative AI 136 may be created to perform intelligent decision-making and predictive outputs.

Thus, images 132 corresponding to images of a document from document submissions 131 may be processed, scored, and/or verified in response to document verification requests 124 from service applications 122. The image data for images 132 may be filtered by document verification platform 130 and preprocessed, such as to provide general image cleansing, filtering noise, and the like. Further, document verification platform 130 may perform data preprocessing in order prepare the image data for object detection and classification. Document verification platform 130 may first execute image processing NN 133, which may correspond to a specifically trained NN for object detection, data extraction, and/or document verification of documents detected in images 132. Image processing NN 133 may be trained using past images of documents so that document verifications may be performed, such as based on scores, extracted data, and the like. During the scoring, an object classification NN may attempt to classify a quality of image data and/or document image quality (e.g., ability for document data or content to be read, extracted, etc.).

Document verification platform 130 may then output image verifications 134 and/or verification failures 135. For example, image verifications 134 may correspond to those ones of images 132 that may be approved for corresponding ones of document submissions 131 provided from document verification requests 124 for document image processing, verification, and/or data extraction (e.g., approved and/or validated for data, approved for using OCR or the like to extract image data, etc.). However, verification failures 135 may indicate those ones of images 132 that may be designated for repair by image repair generative AI 136. Image repair generative AI 136 may include one or more image processing and/or adjusting operations to attempt to fix corresponding ones of images 132, or portions within those of images 132, so that data can be properly read and/or verified. This may be done automatically without user input and/or image recapture.

For example, image repair generative AI 136 include generators 137 and discriminators 138 to generate repaired image data 139 for those of images 132 having all or a portion of low or poor quality that inhibits, prevents, or fails document verification, readability, and/or extractability. In this regard, image repair generative AI 136 may correspond to a GAN (including training using CycleGAN framework as described herein) other deep convolution NN, or other generative AI to image-to-image translation, pairing, and/or image data generation. For example, generators 137 may correspond to deep NNs trained to generate images from input image source material, such as generating high-quality images from low-quality images, or vice versa by generating low-quality images from high-quality images. Discriminators 138 may correspond to deep NNs trained to distinguish between high- and low-quality images and therefore whether the generated image output of generators 137 is high or low-quality and/or reflects the source input images.

As such, generators 137 may be used to generate image data with discriminators used to distinguish and discriminate between the image data of different quality. This allows for training of one set of a generator and discriminator to generate high-quality images by feeding the generator low-quality images, where the discriminator is used to identify differences and loss between high-quality images and whether the generator has performed adequately. A second set of a generator and discriminator may be trained in a reverse manner by feeding the generator high-quality images and having the generator generate low-quality images, where the discriminator is used to distinguish between low-quality images and whether the generator has adequately introduced quality issues to obscure document data. Together, the two sets may be used in CycleGAN training by connecting the outputs of each to the inputs of the other, which allows for creation of image repair generative AI 136 for generating repaired image data 139. The training and use of generators 137 and discriminators 138 for generating repaired image data 139 is discussed in further detail below with regard to FIGS. 2-4B.

Service applications 122 may correspond to one or more processes to execute modules and associated specialized hardware of service provider server 120 to process a transaction or provide another service to customers or end users of service provider server 120. For example, service applications 122 may include a transaction processing application and may correspond to specialized hardware and/or software used by service provider server 120 to providing computing services to users, which may include electronic transaction processing and/or other computing services provided by service provider server 120, such as in response to receiving transaction data for electronic transaction processing of transactions initiated using digital wallets. In some embodiments, service applications 122 may be used by users, such as a user associated with user device 110, to establish user and/or payment accounts, as well as digital wallets, which may be used to process transactions. Accounts may be accessed and/or used through one or more instances of a web browser application and/or dedicated software application executed by user device 110 and engage in computing services provided by service applications 122.

In various embodiments, financial information may be stored to the account, such as account/card numbers and information. A digital token for the account/wallet may be used to send and process payments, for example, through an interface provided by service applications 122. The payment account may be accessed and/or used through a browser application and/or dedicated payment application executed by user device 110 and engage in transaction processing through service applications 122. Service applications 122 may process the payment and may provide a transaction history to user device 110 for transaction authorization, approval, or denial. In other embodiments, service applications 122 may instead provide different computing services, including social networking, microblogging, media sharing, messaging, business and consumer platforms, etc. Such services may be utilized through user accounts, websites, software applications, and other interaction sources, which may request document verification to allow, enable, or provide certain computing services, verify users, and the like through document verification requests 124.

Service applications 122 may also provide additional features to service provider server 120 and/or user device 110. For example, service applications 122 may include security applications for implementing server-side security features, programmatic client applications for interfacing with appropriate application programming interfaces (APIs) over network 140, or other types of applications. Service applications 122 may contain software programs, executable by a processor, including one or more GUIs and the like, configured to provide an interface to the user when accessing service provider server 120, where the user or other users may interact with the GUI to more easily view and communicate information. In various embodiments, service applications 122 may include additional connection and/or communication applications, which may be utilized to communicate information to over network 140.

Additionally, service provider server 120 includes database 126. Database 126 may store various identifiers associated with user device 110. Database 126 may also store account data, including payment instruments and authentication credentials, as well as transaction processing histories and data for processed transactions. Database 126 may store financial information and tokenization data, as well as transactions, transaction results, and other data generated and stored by service applications 122. Further, database 126 may include data provided for document verification requests 124, including document submissions 131 having images 132.

In various embodiments, service provider server 120 includes at least one network interface component 128 adapted to communicate with user device 110 and/or other computing devices and servers directly and/or over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
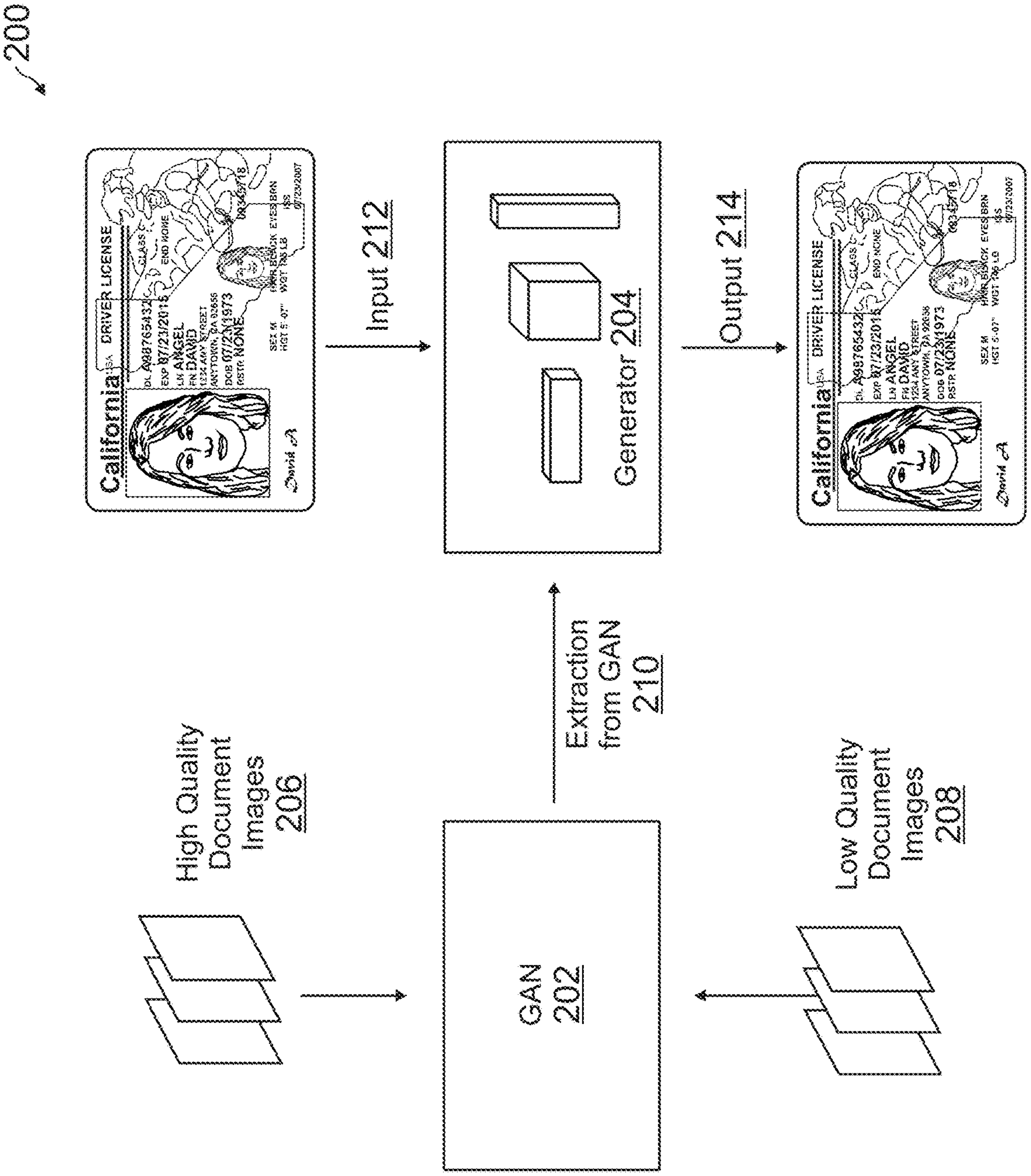
FIG. 2 is an exemplary system architecture of a generative AI having one or more NNs for image repair based on generating and discriminating between low-quality images and high-quality images, according to an embodiment.

FIG. 2 is an exemplary system architecture 200 of a generative AI having one or more NNs for image repair based on generating and discriminating between low-quality images and high-quality images, according to an embodiment. System architecture 200 of FIG. 2 includes components of an NN framework for providing image repair and image quality enhancement of images of low-quality and/or having low-quality portions, such as the components of document verification platform 130 of service provider server 120 from system 100 of FIG. 1. In this regard, an identification card (ID card) or the like may be captured in an image and provided as input to a GAN 202 or other generative AI in system architecture 200 for analysis of image data for image quality and improvement of image quality through image data generation and image repair.

In system architecture 200, GAN 202 may correspond to a multilayer NN that may include an input layer configured to take, as input, hidden layers having nodes and interconnections between nodes making up neurons of the NN, and an output layer that outputs generated image data for image repair. For example, GAN 202 may include a generator 204 for a NN corresponding to a GAN-type NN, convolution neural network (CNN, where CNN may refer to the collective name of network architectures that use convolution operations, such as a ConvNet layer), and/or one or more Pix2Pix NN models. GAN 202 may include generator 204 trained using high-quality document images 206 and low-quality document images 208, as discussed further below with regard to FIGS. 3A-4A. For example, high-quality document images 206 and low-quality document images 208 may be provided together in pairs as labeled training data (e.g., with annotations labeling the images and high or low-quality of the same or similar document) so that generator 204 may be trained to generate image data.

To train generator 204, discriminators may be used to identify whether images that are generated are fake (e.g., generated by a generator) or real images, thereby providing feedback when training GAN 202 and generator 204. Identification of whether an image is of higher quality or low-quality can be based on various factors, including whether the system determines, after an initial scan or processing of the image, whether sufficient data can be extracted to provide an output within a desired threshold of accuracy. If so, the image may be identified as high, higher, or acceptable quality, and if not, the image may be identified as a low or unacceptable quality. In another example, an initial scan or processing of the image is performed to determine whether the image meets or exceeds a clarity threshold, which may vary based on the type of document and type of authentication/verification. As such, image quality may be based on readability, extractability, and/or threshold requirements. For example, a "high" quality image may correspond to an image meeting or exceeding a threshold that allows for image data extraction and/or document verification to a threshold or confidence rating/score. Conversely, a "low" quality image may correspond to an image that falls below or fails to meet or exceed such threshold (e.g., at or below) so as to prevent data review, extraction, and/or validation and/or not meeting a confidence rating/score after performing such review, extraction, and/or validation.

A reverse training operation may be used to train a portion or model of GAN 202 for low-quality image generation, and CycleGAN may further be used during training, as discussed herein. As such, GAN 202 may be trained and may include multiple generators and discriminators, where one such generator (e.g., generator 204) may be trained for high-quality image generation and/or image repair of low-quality images to high-quality images. After training, generator 204 may be extracted from GAN and utilized during image repair operations. An input 212 may be provided to generator 204, such as an image having a first image quality, such as a poor or bad quality and/or of sufficiently low-quality to require document repair for document validation in the image. Generator 204 may then process input 212 and procedurally and intelligently generate new image data. An output 214 may include the new image data, repaired image, and/or image content generated by the generative AI using generator 204 so that the image may be reviewed, processed, and/or have image content verified (e.g., verifying a document and/or documents data or content in the image). In some embodiments, output 214 may further include the image from input 212 for comparison and/or model retraining or tuning.

FIG. 3A-3E are exemplary diagrams 300*a*-300*e* of image repair processes and NNs for a generative AI for image repair of captured document images for document image submissions, according to embodiments. Diagrams 300*a*-300*e* of FIGS. 3A-3E show exemplary training data, training, and utilization of a GAN or other generative AI for creation of a generator NN that provides image repair. In this regard, diagrams 300*a*-300*e* show data, components, and processes that may be included on or executed by document verification platform 130 of service provider server 120 from system 100 of FIG. 1.

Figure 3A:
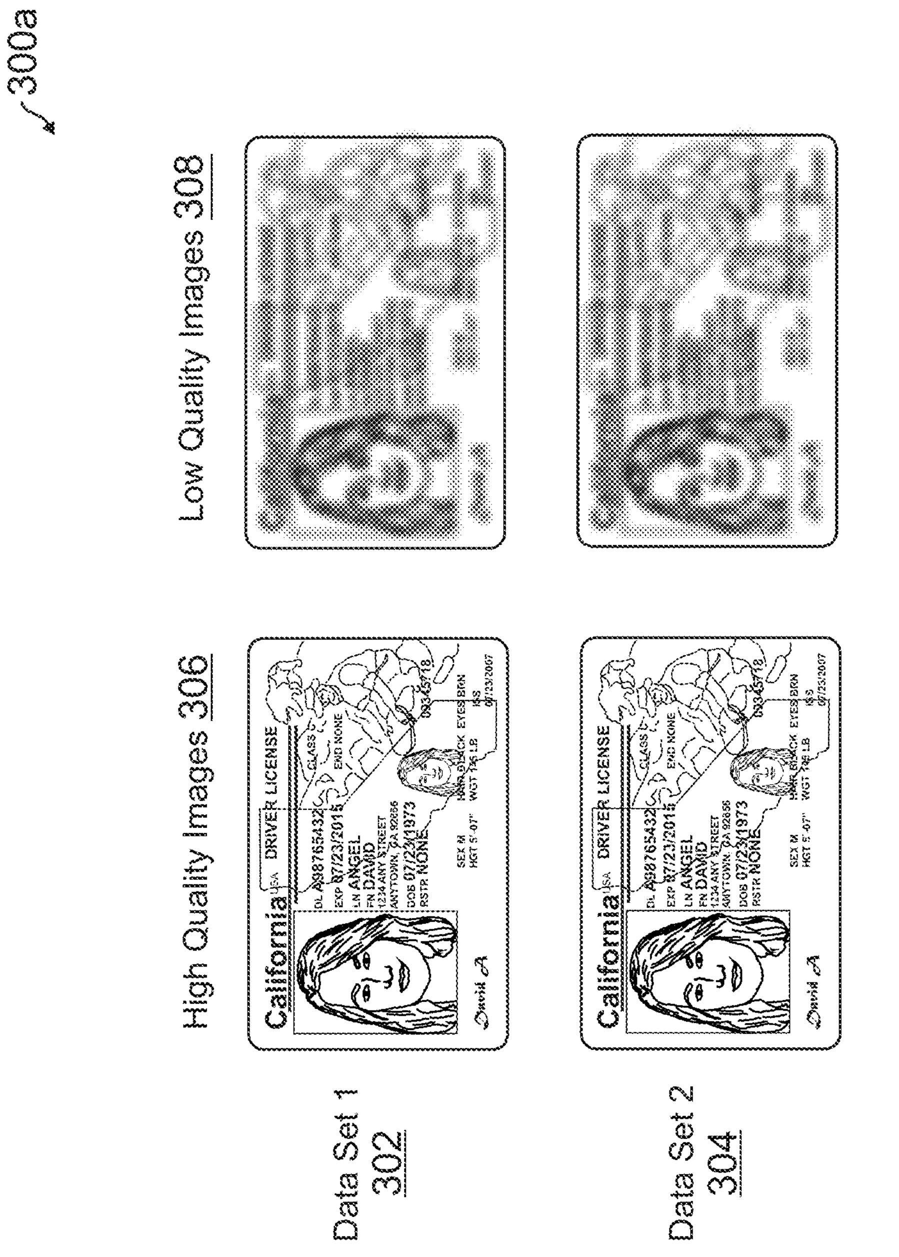
FIG. 3A-3E are exemplary diagrams of image repair processes and NNs for a generative AI for image repair of captured document images for document image submissions, according to embodiments.

Referring now to FIG. 3A, in diagram 300*a*, exemplary training data of image pairs for low- and high-quality images are shown. Diagram 300*a* includes two data sets of paired images each having different types of low-quality images due to image capture or visibility issues, such as image issues or effects due to blur, resolution, glare, lighting, camera quality, artifacts, incidental capture of other content (e.g., finger over a portion of a lens, object coming in between the document and camera, etc.), and the like. In this regard, each data set may be annotated to show the image pairs and image qualities of each image. Data set 1 302 includes two images, one for high-quality images 306 having an image of high enough quality that data may be extracted and/or the document read for verification, as well as one image for low-quality images 308. Data set 2 304 similarly includes two images, one for high-quality images 306 and one for low-quality images 308.

Initially with training data, data set 1 302 and data set 2 304 may be provided based on known training examples that are paired and annotated. Further, during training, high-quality images 306 may be generated from low-quality images 308 during generator and discriminator training for a GAN or other generative AI, as discussed below with regard to FIG. 3B. Low-quality images 308 may further be generated by augmentation, such as by having a generator introduce image clarity issues. Such augmentation may include those generated by gaussian blur, motion blur (including application via convolution with a different kernel or filter), defocus blur, gaussian noise or ISO (camera light sensitivity) noise, upscaling and downscaling, JPEG compression, and/or brightness adjustment, or any combination thereof including randomization of combinations for randomized synthetic noise or other synthetic image effect. As such, a generator may procedurally generate low-quality images 308 from high-quality images 306 using such as during reverse training where a discriminator may then evaluate low-quality images 308 that have been generated to provide image quality feedback to the generator during reverse training, as discussed below with regard to FIG. 3C.

Figure 3B:
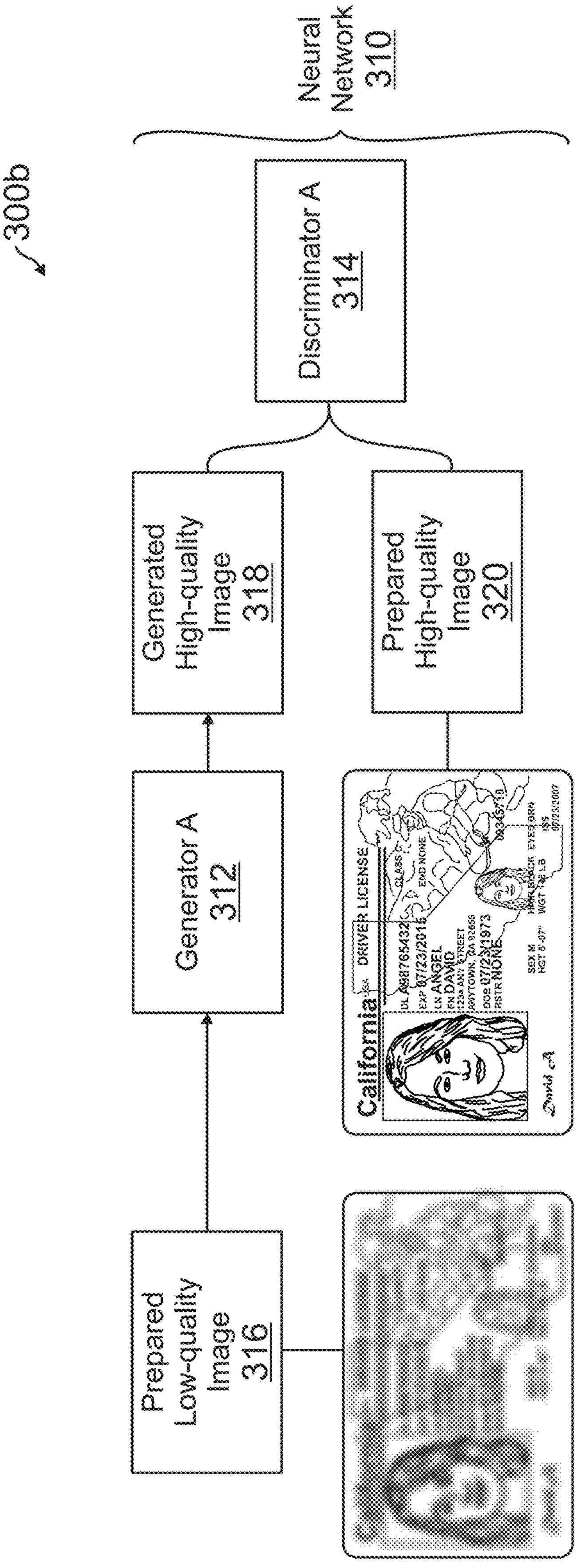

Referring now to FIG. 3B, in diagram 300*b*, a series of interactions are shown where a first half or portion of a GAN may be trained to generate high-quality images from low-quality images and discriminate (e.g., evaluate and provide feedback for) image quality of those generated high-quality images when compared to one or more other real high-quality images for generator retraining and/or tuning. When beginning training a generator A 312 in diagram 300*b* with a discriminator A 314, generator A 312 produces an obviously fake document image, and discriminator A 314 may quickly learn to tell that this is a fake document and not real, such as by matching to the real high-quality document image(s). However, as training progresses, generator A 312 gets closer to producing an output that can fool discriminator A 314, i.e., discriminator A 314 determines the output (a repaired version of the poor document image) is a real high-quality image. Finally, if generator training of generator A 312 goes well, discriminator A 314 gets worse at telling the difference between real and fake document images from generator A 312. Thus, discriminator A 314 starts to classify fake document images as real, and discriminator A 314 accuracy decreases and the accuracy of generator A 312 in producing real appearing and/or high-quality images (e.g., repaired images) from low-quality images increases. As such, after training is completed (e.g., accuracy sufficiently improved to generating real-like or repair images), generator A 312 may be used to generate the content in an image and therefore “repair” the image or generate repair data and/or a repaired image to recover the original document in a low-quality image.

In this regard, a data augment is created with good and bad document pairs, such as data set 1 302 and data set 2 304 from diagram 300*a* of FIG. 3A. As such, an image pair may be selected for training as shown in diagram 300*b*, and initially a prepared low-quality image 316 is provided as input to generator A 312. The NN and/or generative AI shown in diagram 300*b* may correspond to a Pix2Pix model or other type of GAN or image-to-image generative AI for image data generation. In this regard, when prepared low-quality image 316 is provided as input, generator A 312 generates a generated high-quality image 318. Generated high-quality image 318 may then be fed or provided to discriminator A 314 as input with a prepared high-quality image 320 from the image pair including prepared low-quality image 316. Discriminator A 314 then provides image quality feedback, such as loss and image quality and/or accuracy of generator A 312 in recreating or mirroring prepared high-quality image 320 when creating generated high-quality image 318. This is then used for improving generator A 312 during retraining and/or tuning.

Figure 3C:
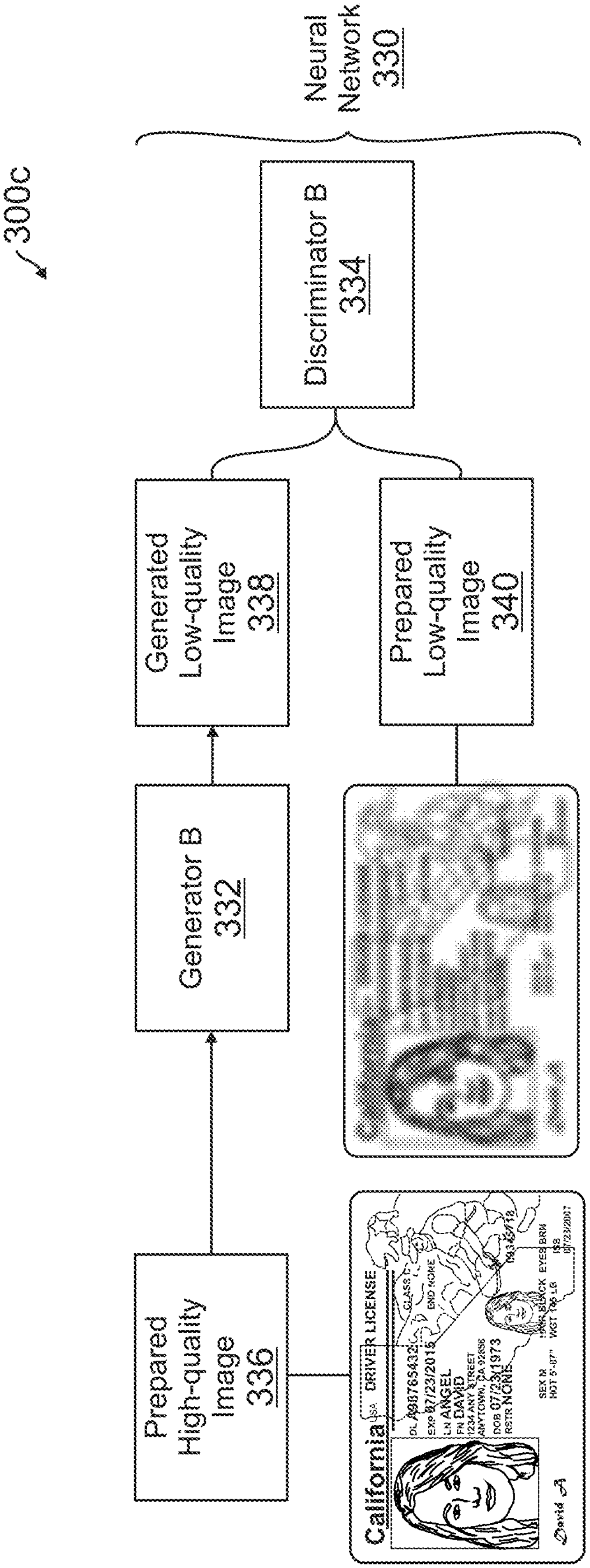

Referring now to FIG. 3C, in diagram 300*c*, a series of interactions are shown for reverse training of a generator to recreate low-quality images from high-quality images by introducing one or more procedurally created and/or synthetic image quality issues (e.g., by introducing a synthetic image effect) as discussed with regard to diagram 300*a* of FIG. 3A. For example, the NN and/or generative AI in diagram 300*c* may similarly correspond to a Pix2Pix model or other type of GAN or image-to-image generative AI for image data generation. In this regard, the training of a generator B 332 using a discriminator B 334 may be performed in a reverse manner to that shown in diagram 300*b* of FIG. 3B, that is that high-quality images are used to generate low-quality images by generator B 332, which are then compared by discriminator B 334 to the low-quality images paired with low-quality images for model retraining and tuning. As such, when a prepared high-quality image 336 is provided as input, generator B 332 generates a generated low-quality image 338. Generated low-quality image 338 may then be fed or provided to discriminator B 334 as input with a prepared low-quality image 340 from the image pair including prepared high-quality image 336. Discriminator B 334 then provides image quality feedback, such as loss and image quality and/or accuracy of generator B 332 in recreating or mirroring prepared low-quality image 340 when creating generated low-quality image 338. This is then used for improving generator B 332 during retraining and/or tuning.

Figure 3D:
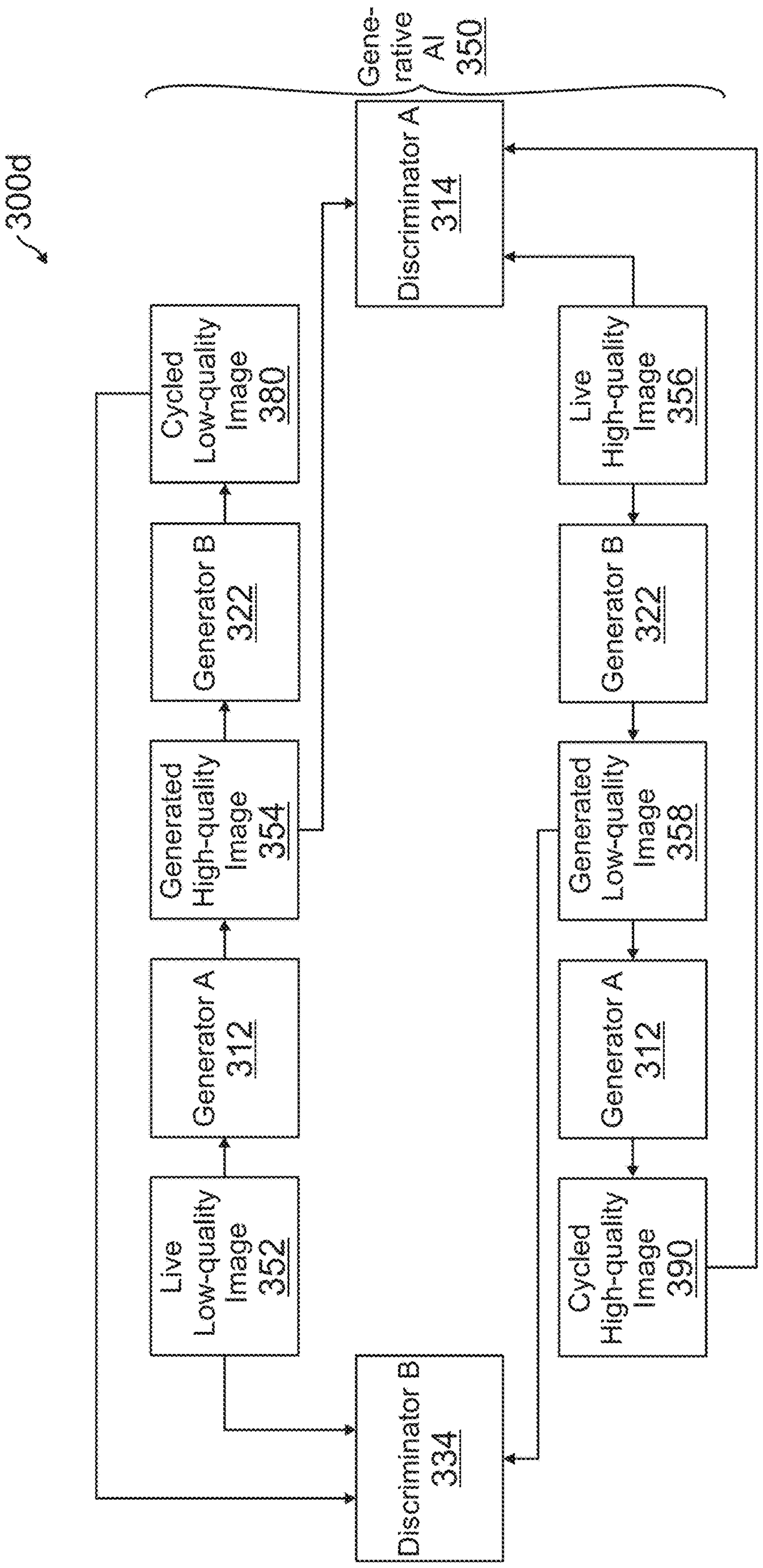

Referring now to FIG. 3D, in diagram 300*d*, a generative AI 350 may be created by linking the GANs shown in diagrams 300*b* and 300*c* and then tuned or finetuned for further training and optimization in image repair and image data generation. As such, diagram 300*d* may show an exemplary CycleGAN training process using the outputs of generator A 312, generator B 332, discriminator A 314, and discriminator B 334. For example, CycleGAN or other cycle training for generative AIs may not require paired and/or user annotated training data to further finetune the model with real original data. Instead, outputs of the generative AIs for generator A 312 and generator B 332 may be used, with discriminator A 314 and discriminator B 334 being used to provide feedback. As such, live images (e.g., received from live production data and/or live input data during model finetuning) may be received for model finetuning.

In this regard, in the upper half of diagram 300*d*, generator A 312 is used to process input for a live low-quality image 352 and generate a generated high-quality image 354. As such, live low-quality image 352 first goes to generator A 312 to be translated to generated high-quality image 354, which then goes to generator B 322. Generator B 322 then translates generated high-quality image 354 back to a low-quality image, cycled low-quality image 380. Then, discriminator B 334 distinguishes between cycled low-quality image 380 from live low-quality image 352, where feedback is used to optimize both generator A and generator B, referred to as "Cycle" GAN.

In the bottom half of diagram 300*d*, generator B 332 is used to process input for live high-quality image 356 and generate a generated low-quality image 358. As such, live high-quality image 356 first goes to generator B 322 to be translated to generated low-quality image 358, which then goes to generator A 312. Generator A 312 then translates generated low-quality image 358 back to a high-quality image, cycled high-quality image 390. Then, discriminator A 314 distinguishes between cycled high-quality image 390 from live high-quality image 356, where feedback is used to optimize both generator A and generator B. These processes may be linked in a cycle to further train and tune each of generator A 312 and generator B 332 so that each may become better at generating corresponding image data and therefore fooling discriminator A 314 and discriminator B 334, respectively.

As such, generative AI 350 may correspond to a model that is an extension of a Pix2Pix or similar generative AI architecture which involves simultaneous training of two generator models and two discriminator models. Unpaired datasets may be used and images converted in a reverse direction (e.g., from target to source document) using the same mode so that training may be further tuned for document image repair used for verification. Thereafter and when fully trained and tuned, generator A 312 may be extracted and/or utilized for generative AI 350 to provide image repair of low-quality images by generating predicted and procedurally generated high-quality images intelligently so that document content in the images may be read, extracted, or otherwise processed (e.g., for document verification).

Figure 3E:
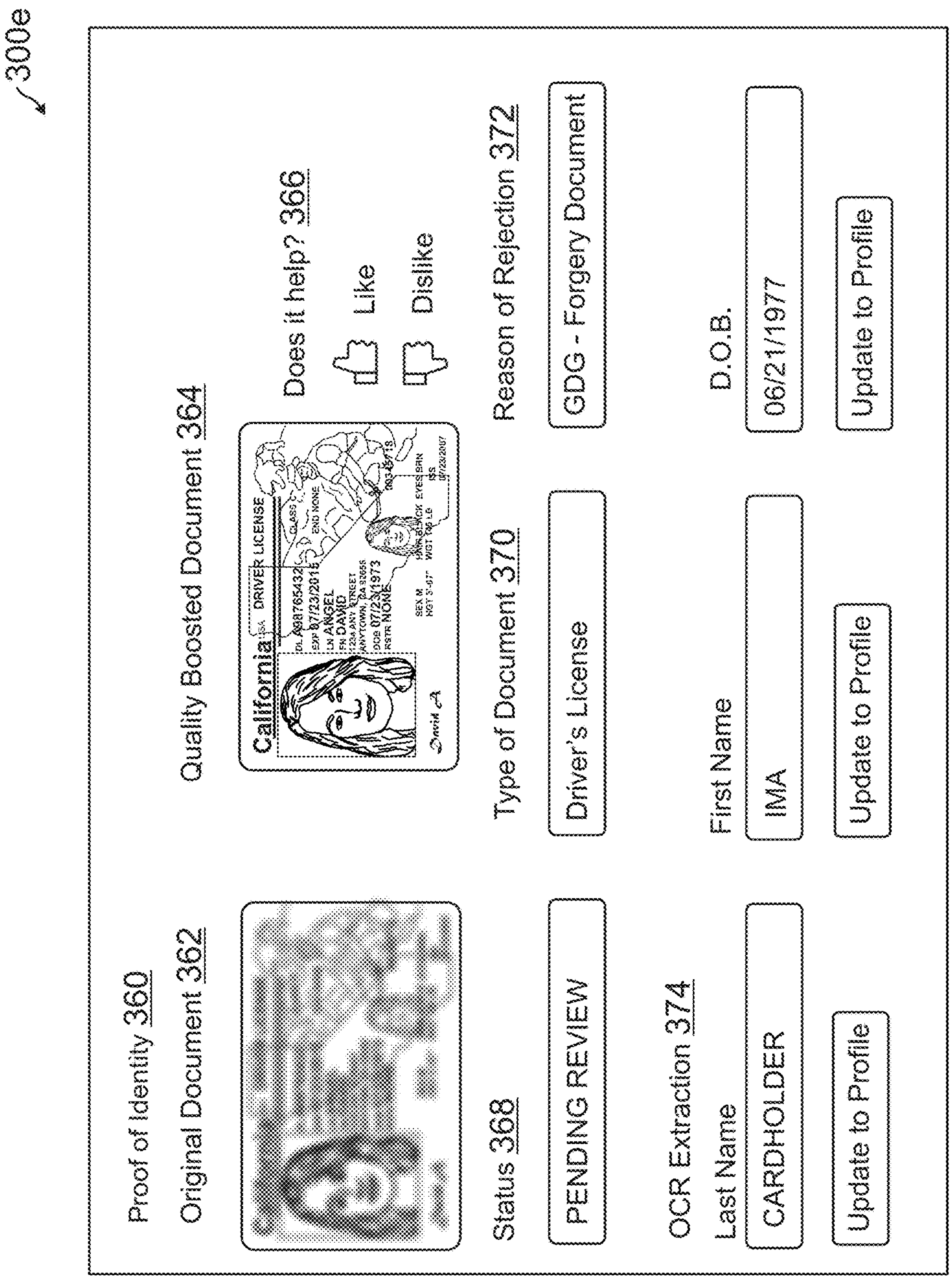

Referring now to FIG. 3E, in diagram 300*e*, a dashboard or other user interface is shown when a user may be submitting one or more document images for document verification, which may be include image repair using generator A 312 and/or other components of generative AI 350. For example, initially, a user may go through a "know you customer" (KYC) information submission flow for a proof of identity 360 that requires a document submission and verification. During the KYC or other flow for proof of identity 360, the user may capture an image of a document and submit that image for verification. As such, an original document image 362 of the document, such as a driver's license, is submitted, but original document image 362 may have lighting or visibility issues (e.g., too dark, or other glare, visual, or lighting effect) that causes the image to be unclear and at least a portion is unreadable. Thus, in original document image 362 provided, one or more image portions, such as fields of a document, may have image data that is unreadable, unextractable, or cannot be processed for the document verification. As such, when submitted to for proof of identity 360, including processing using an object detection NN, OCR, or other document verification, original document image 362 may be of inadequate or insufficient quality to be verified.

As such, a quality boosted document 364 may be provided as output from processing original document image 362 using the generative AI described in diagrams 300*b*-300*d* of FIGS. 3B-3D. Quality boosted document 364 may correspond to a repaired image that may include new and/or procedurally generated image data and content, such as document portions or information recreated from original document image 362. In some embodiments, quality boosted document 364 may correspond to a new image generated by a generative AI. However, in other embodiments, quality boosted document 364 may be created using original document image 362 as a base with repaired image data or portions. For example, a document autocorrection module may utilize the repaired data and/or image or image portion to combine such portions into a merged or combined image where the low-quality portions are replaced, thereby providing an image with all portions meeting or exceeding a required image clarity threshold. In further embodiments, combining of images may be done those image pixel and/or portion updates, image juxtapositions, and/or algorithmic comparisons and mergers of images. When executing image synthesis using two or more images, the base image may be used as a template with the repaired image and/or repair data used to fix the base image of low-quality. The document autocorrection module may crop out the DOB or other field from the other one of the two images and replace using the repaired image data.

Quality boosted document 364 may allow for document verification and therefore feedback 366 may allow for tuning and/or retraining of the generative AI. Feedback 366 may be solicited from the user providing original document image 362. During document verification, additional fields in the user interface for proof of identity 360 may show different information for the document verification process. For example, a status 368 may show a status of the document verification for a type of document 370 (e.g., the shown driver's license) and if there is a reason for rejection 372 that may cause the document's image or document to fail verification. Further, an OCR extraction 374 may display data extracted from original document image 362 and/or quality boosted document 364, such as data necessary for document verification. The document verification process in proof of identity 360 may then utilized for a KYC or other personally identifiable information (PII) verification of the user, an account verification of an account of the user, or a service onboarding by the user with the account.

Figure 4A:
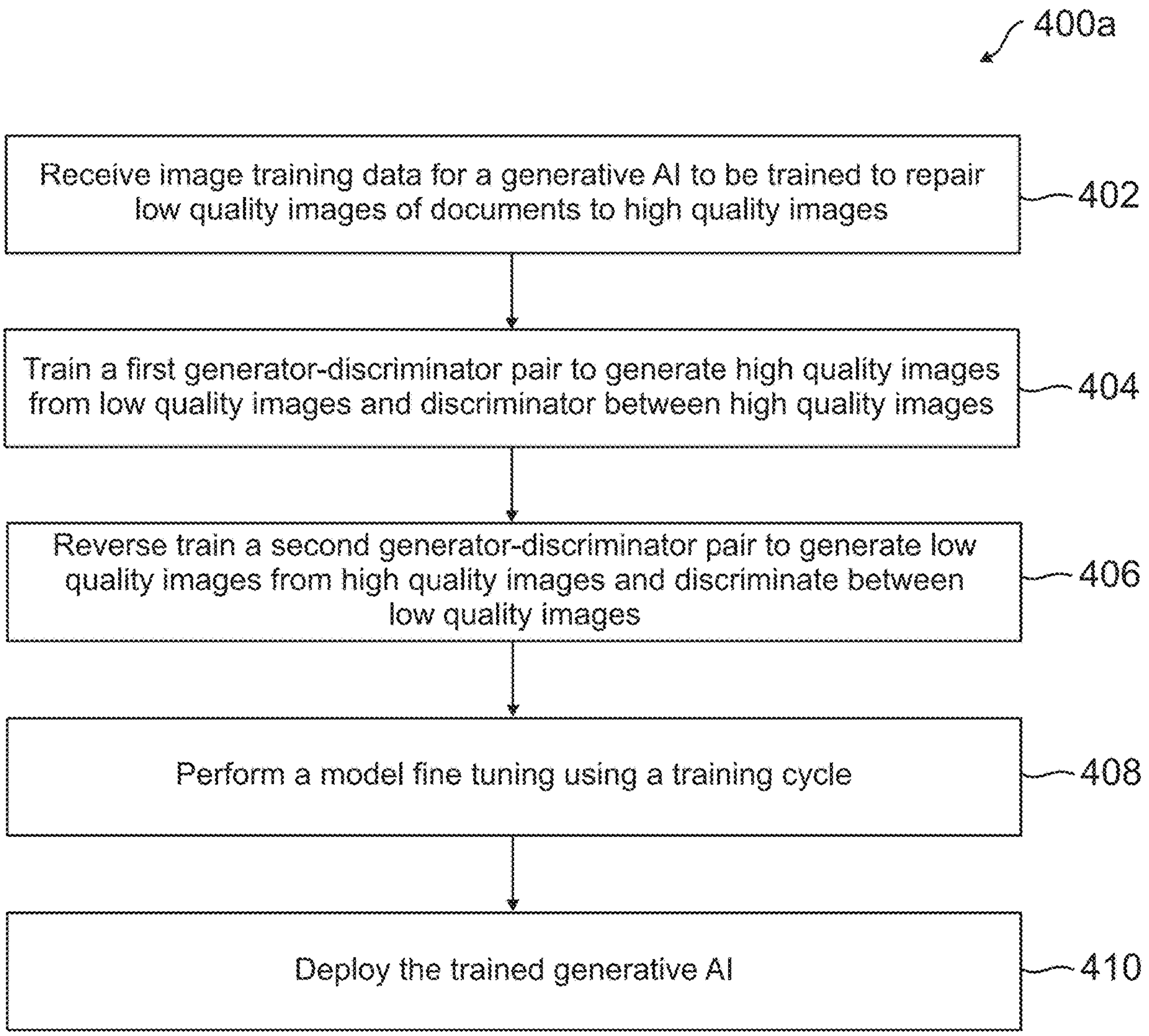
FIGS. 4A and 4B are flowcharts for image repair of captured document images for document image submissions using a generative AI, according to embodiments.
Figure 4B:
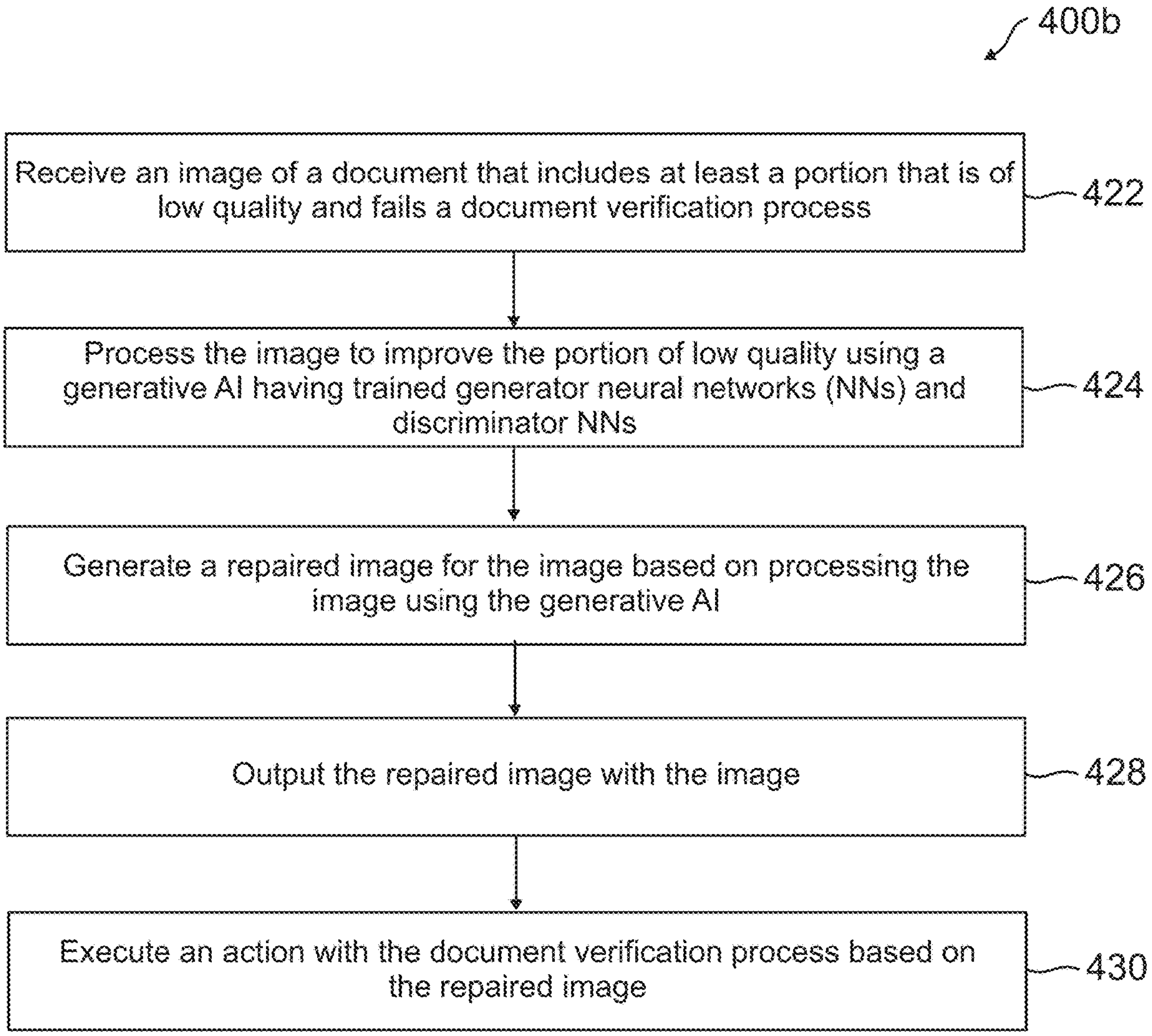

FIGS. 4A and 4B are flowcharts 400*a* and 400*b* for image repair of captured document images for document image submissions using a generative AI, according to embodiments. Note that one or more steps, processes, and methods described herein of flowcharts 400*a* and 400*b* may be omitted, performed in a different sequence, or combined as desired or appropriate. Further note that while flowchart 400*a* describes a model training process for a generative AI that performs image repair and flowchart 400*b* describes an image repair process using such a generative AI, such steps described herein may be performed with other similar steps and sequences, as those of ordinary skill in the art will recognize.

At step 402 of flowchart 400*a*, image training data for a generative AI to be trained to repair low-quality images of documents to high-quality images is received. For example, image training data may correspond to training data samples including those shown in diagram 300*a* of FIG. 3A (e.g., data set 1 302 and/or data set 2 304). These training data samples may include high-quality images that have been provided for training with corresponding annotations indicating that such images are high-quality images. Correspondingly, training data sample may include low-quality images with similar annotations as such. The training data may have high- and low-quality images paired in training data samples shown a high-quality image of a document and a corresponding low-quality image of the document, which allows for distinguishing between such image qualities. For example, image training data may include an image data set having image pairs for initial training examples of high-quality images and low-quality images, as well as fields for document data and content within the images (e.g., key information fields (KIFs) and the like).

At step 404, a first generator-discriminator pair is trained to generate high-quality images from low-quality images and discriminate between high-quality images. One of generators 137 may be trained to generate high-quality images from low-quality images in the training data samples (e.g., training data similar to the images from diagram 300*a*), where one of discriminators 138 may discriminate or provide image quality feedback identifying an image quality (e.g., high or low-quality) for each new image generated by the generator. The generator may therefore receive feedback to become better at generating high-quality images. The generator-discriminator pairs of the generative AI to be trained may correspond to a GAN or other type of generative AI that may provide image-to-image processing and image data generation.

At step 406, a second generator-discriminator pair is reversed trained to generate low-quality images from high-quality images and discriminate between low-quality images. Another one of generators 137 may be trained in a reverse manner to that described with regard to step 406 with another one of discriminators 138. In this regard, the generator of generators 137 may be reverse trained to generate low-quality images from high-quality images in the training data samples (e.g., training data similar to the images from diagram 300*a*), where one of discriminators 138 may discriminate or provide image quality feedback identifying an image quality (e.g., high or low-quality) for each new image generated by the generator. This training occurs in a reverse manner as the high-quality images are now provided as input to lower the quality by introducing image artifacts, effects, or the like that cause the images to fail document verification or other image processing (e.g., data extraction, OCR, or the like). As such, during training, the discriminator may be used to provide feedback that causes the generator to become better at generating low-quality images.

At step 408, a model finetuning is performed using a training cycle. Model finetuning may include using a CycleGAN to train the generative AI through an input output cycle of the generator-discriminator pairs, such as a using a process shown in diagram 300*d* of FIG. 3D to train generative AI 350. For example, additional training examples of high- and low-quality images may be generated by the respective generator-discriminator pairs of generators 137 and discriminators 138, which may be used as input training for the other one of the generator-discriminator pair. This allows the generator to receive the additional training examples and create corresponding high- or low-quality images, which their corresponding discriminator may then provide image quality feedback for to further refine and train the models.

At step 410, the trained generated AI is deployed. For example, image repair generative AI 136 may be deployed with generators 137, that is, the generator that generates high-quality images from low-quality images, finetuned using step 408, to generate repaired image data 139 for those of images 132 having verification failures 135 based on issues in image quality, such as the image having image quality issues in all or a portion that prevents readability, data from being extracted, or otherwise fail image verification due to image quality. In this regard, image repair generative AI 136 may perform operations to provide repaired image data 139 to both users when document verification may fail, or initial image processing indicates image quality issues preventing or inhibiting document verification. Further, image repair generative AI 136 may be provided to document reviewers and/or automated document systems for document verification where repaired image data 139 may be used to verify documents in such images requiring repair for image quality. The process to use image repair generative AI 136 is further discussed below with regard to FIG. 4B.

For example, an exemplary method for performing steps 402-410 may include receiving image training data for a generative AI model that repairs images having one or more fields for corresponding image data, wherein the image training data comprises an image data set having image pairs for initial training examples of high-quality images and low-quality images. The method may further include training a first generator and a first discriminator using the image training data, wherein the first generator generates new high-quality images from the low-quality images and the first discriminator provides image quality feedback identifying an image quality of each of the new high-quality images to the first generator. The method may further include training a second generator and a second discriminator using the image training data, wherein the second generator generates new low-quality images from the high-quality images and the second discriminator provides the image quality feedback identifying the image quality of each of the new low-quality images to the second generator. The method may further include performing a model finetuning of the generative AI model using a training cycle that combines the first generator with the second generator, wherein the performing the model finetuning includes generating additional training examples of the new high-quality images and the new low-quality images for the first discriminator and the second discriminator, and wherein the training cycle includes the first discriminator and the second discriminator providing the image quality feedback to the first generator and the second generator and identifying the image quality of the additional training examples for the model finetuning. Finally, the method may include outputting the generative AI model having a first NN associated with the first generator with the second generator and a second NN associated with the first discriminator and the second discriminator.

Referring now to flowchart **400*b* of FIG. 4B, at step 422, an image of a document that includes at least a portion that is of low-quality and fails a document verification process is received. For example, user device 110 may be used to capture document image 114 using application 112, which may be submitted to document verification platform 130 for document verification, such as to use one or more of the services provided via service applications 122. In this regard, the user may be prompted to capture an image of the document, such as by using a mobile smart phone with corresponding digital camera. Image processing NN 133 may indicate that document image 114 and/or one or more of images 132 may be of low image quality and therefore may fail a document verification process, such as processes for data extraction, OCR, text or object recognition, or the like. Thereafter, image repair generative AI 136** may be invoked or otherwise accessed to provide image repair of the low-quality image and/or image portion.

At step 424, the image is processed to improve the portion of low-quality using a generative AI having trained generator NNs and discriminator NNs. For example, with images 132, portions with low-quality causing verification failures 135 or the like may be processed using image repair generative AI 136 to provide repaired image data 139 that may improve the low-quality image and/or low-quality image portion. For example, repaired image data 139 may correspond to a new and/or altered image that provide clarifying image portions or data that may be read or extracted for document verification, such as reconstructed and/or predicted data for low-quality images and/or image portions. Repaired image data 139 may instead correspond to data necessary to resolve low-quality image effects or causes, such as filters or the like to reduce or adjust glare, blurriness, and the like.

As such, the generator NNs may be used by the generative AI after training and finetuning using the discriminator NNs to intelligently and/or procedurally generate image data that allows for processing of images. The generative AI may correspond to a GAN or other image generative AI that may generate image content from initial input images, including image content of higher quality and/or to replace unreadable or unextractable image content in areas of an image (e.g., content for a captured document). At step 426, a repaired image for the image is generated based on processing the image using the generative AI. Repaired image data 139 may be output as a new or altered image having the repaired portions based on the repairing by the generative AI. As such, at step 428, the repaired image is output with the image. Output of both images may be provided to a user, for example, to allow the user to select whether the repaired image is correct or proceed otherwise (e.g., to recapture an image, alter the image and/or input missing image or document data, etc.). In other embodiments, the image and repaired image may be output to an automated system for processing and/or document verification, as well as to a reviewer or other user that may perform manual review and verification, such as for confirmation of correct image repair, model retraining or configuring, and the like.

At step 430, an action is executed with the document verification process based on the repaired image. If image repair is sufficient, the image may be approved and/or recommended for submission to the document verification process, such as for approval by image processing NN 133. However, if insufficient, further repair of the image and/or recapture of the document in further images may be suggested and/or performed. As such, service applications 122 may respond to document verification requests 124 with the results of image repair by image repair generative AI 136 and/or image verification by image processing NN 133.

Figure 5:
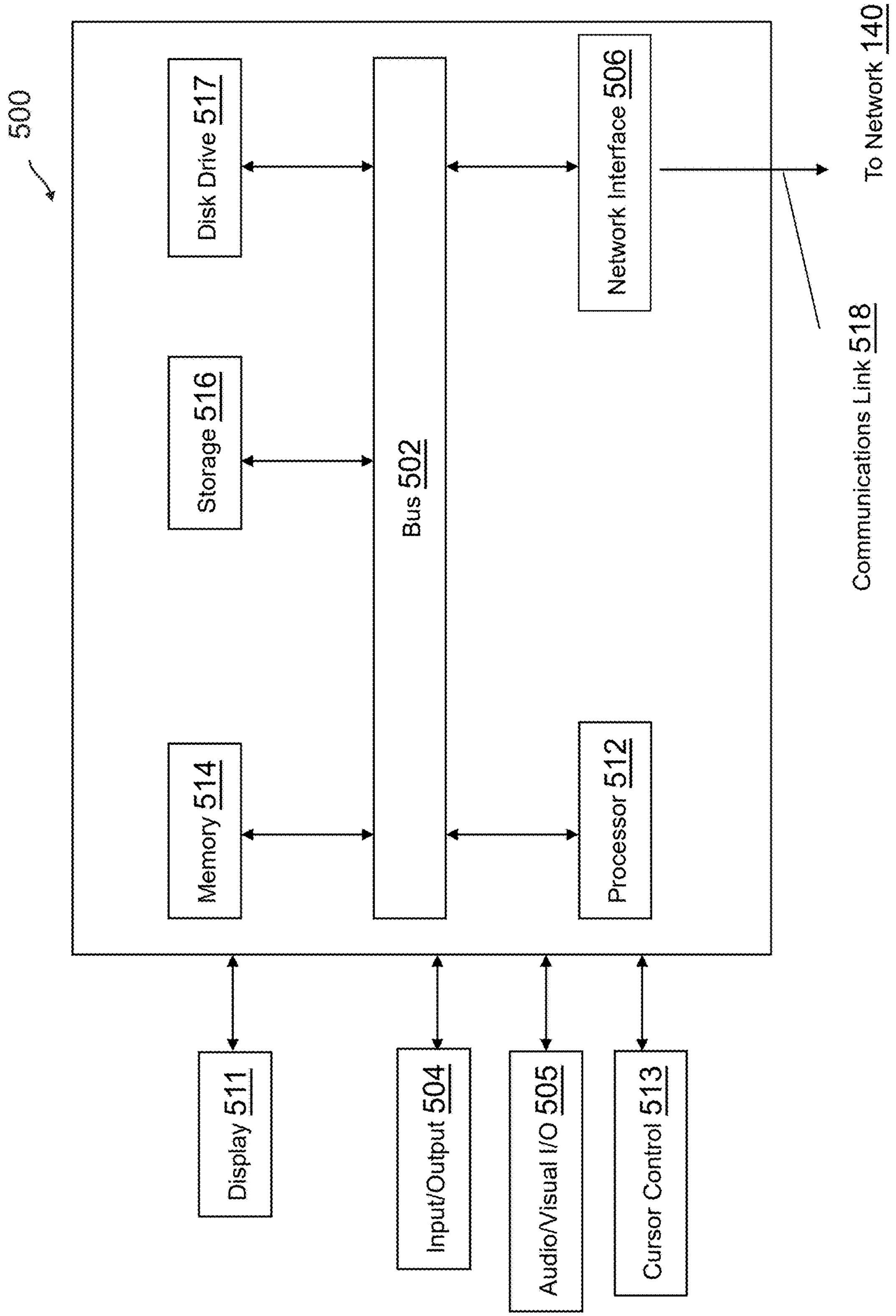
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:

a non-transitory memory; and one or more hardware processors coupled to the non-transitory memory and configured to read instructions from the non-transitory memory to cause the system to perform operations comprising:

accessing a first image of a document for a user that is submitted for a document verification process of the document;

executing an image processing neural network framework comprising at least a generative artificial intelligence (AI) model having a first neural network generator that generates high-quality images and low-quality images from real image training data and a second neural network discriminator that distinguishes between the high-quality images and the low-quality images, wherein the first neural network generator comprises a first generator that generates new high-quality images from the low-quality images and a second generator that generates new low-quality images from the high-quality images, and wherein the second neural network discriminator comprises a first discriminator that provides image quality feedback identifying an image quality of each of the new high-quality images to the first generator and a second discriminator that provides the image quality feedback identifying the image quality of each of the new low-quality images to the second generator;

generating repaired image data for the first image that alters at least one field in the first image to improve an image quality of the at least one field, wherein the image quality in the first image of the at least one field limits a data extraction of corresponding document data on the document used for the document verification process, and wherein the repaired image data comprises image data for the at least one field that enables the data extraction of the corresponding document data;

providing the repaired image data with the first image; and executing an action based on the repaired image data for the document verification process.

2. The system of claim 1, wherein, prior to the accessing, the operations further comprise:

training the first neural network generator and the second neural network discriminator using training data comprising an image data set having image pairs of high-quality images with low-quality images, and wherein the training the first neural network generator and the second neural network discriminator comprises:

training the first neural network generator and the second neural network discriminator using the image training data, wherein the first neural network generator comprises the first generator and the second generator, and wherein the second neural network discriminator comprises the first discriminator and the second discriminator.

3. The system of claim 1, wherein the second generator generates the new low-quality images using higher order augmentation.

4. The system of claim 3, wherein the operations further comprise:

performing a model finetuning of the generative AI model using a training cycle that combines the first generator with the second generator, wherein the performing the model finetuning includes generating additional training examples of the new high-quality images and the new low-quality images for the first discriminator and the second discriminator, and wherein the training cycle includes the first discriminator and the second discriminator providing the image quality feedback to the first generator and the second generator and identifying the image quality of the additional training examples for the model finetuning.

5. The system of claim 1, wherein, prior to the accessing the first image, the operations further comprise:

identifying that the first image is at or below a threshold image quality to qualify as a low-quality image, wherein the accessing is performed in response to the identifying.

6. The system of claim 1, wherein the providing the repaired image data comprises repairing the first image with the repaired image data to improve the image quality of at least a portion of the first image associated with the at least one field to be of a higher quality in the repaired first image than the first image.

7. The system of claim 1, wherein the providing the repaired image data with the first image is to a document verification platform, and wherein the operations further comprise:

processing a verification of the document for the user in the document verification platform using the document verification process, the repaired image data, and the first image.

8. The system of claim 7, wherein the accessing the first image is performed in response to the verification of the document initially failing the document verification process in the document verification platform.

9. The system of claim 1, wherein the executing the action comprises one of submitting the first image with the repaired image data to the document verification process for processing, performing an optical character recognition (OCR) process on the first image with the repaired image data for the data extraction, or transmitting a request for the user to resubmit the document in a second image.

10. A method comprising:

detecting that a first image of a document for a user that is submitted for a document verification process of the document has failed due to an image quality of at least one field in the first image;

determining that the first image is capable of being repaired using an image processing neural network (NN) framework comprising at least a generative artificial intelligence (AI) having generator NNs that generate high-quality images and low-quality images from real image training data and discriminator NNs that distinguish between the high-quality images and the low-quality images, and wherein a first pair of the generator NNs and discriminator NNs is trained using reverse training with the real image training data to generate the low-quality images from the high-quality images;

wherein the reverse training includes generating the low-quality images from the high-quality images using one of the generator NNs for the first pair, and wherein the reverse training further includes training a corresponding one of the discriminator NNs for the first pair using the generated low-quality images with corresponding ones of the high-quality images;

generating a repaired image of the first image that alters the at least one field in the first image that improves the image quality for a data extraction of corresponding document data on the document used for the document verification process; and outputting the repaired image with the first image in the document verification process.

11. The method of claim 10, wherein the outputting the repaired image with the first image comprises retrying a verification of the document using the repaired image with the first image in the document verification process, and wherein the retrying the verification includes identifying the repaired image for review during the document verification process of the at least one field altered to improve the image quality.

12. The method of claim 10, wherein the outputting the repaired image comprises outputting the repaired image in a user interface of a document verification process to the user with a request for a confirmation of the at least one field altered in the repaired image.

13. The method of claim 10, wherein the reverse training further uses higher order augmentation for a sequence of image operations applied to the high-quality images.

14. The method of claim 10, wherein, prior to the detecting, the method further comprises:

training the generator NNs and the discriminator NNs using training data comprising an image data set having image pairs of the high-quality images with the low-quality images.

15. The method of claim 14, wherein, prior to the detecting, the method further comprises:

performing a model finetuning of the generative AI model using a training cycle of the generator NNs and the discriminator NNs with the training data.

16. The method of claim 10, wherein the generator NNs and the discriminator NNs comprise two pairs of NNs each having one generator NN and one discriminator NN.

17. The method of claim 10, wherein the detecting comprises:

identifying that the first image is at or below a threshold image quality to qualify as a low-quality image based at least on the image quality of the at least one field.

18. The method of claim 10, wherein the document comprises a user identity document, and wherein the at least one field comprises one of a user image or user information present on the document and user to verify an identity of the user.

19. A non-transitory machine-readable medium having stored thereon machine-readable instructions executable to cause a machine to perform operations comprising:

receiving a document image for a verification;

processing the document image using a neural network (NN) framework for document image repair, wherein the NN framework comprises a generative artificial intelligence (AI) having a generator NN component that generates first images of a first quality and second images of a second quality that is lower than the first quality of the first images from real image training data and a discriminator NN component that distinguishes between the first images and the second images, and wherein the generator NN component and the discriminator NN component comprises at least two generator-discriminator pairs having one of the at least two trained using reverse training with the real image training data of the first quality and the second quality;

wherein the reverse training includes generating the second images of the second quality from the first images of the first quality using one of the generator-discriminator pairs for a sequence of image operations applied to the first images, and wherein the reverse training further includes training a corresponding discriminator NN component using the generated second images with corresponding ones of the first images;

repairing the document image using the NN framework that improves an image quality of at least one portion of the document image for a data extraction of corresponding document data in the document image used for the verification, and wherein the repaired document image enables the data extraction of the corresponding document data in the at least one portion; and outputting, for the verification, the repaired document image with the document image.

20. The non-transitory machine-readable medium of claim 19, wherein the reverse training comprises generating one or more of the first images of the first quality that is higher than the second quality by introducing a synthetic image effect to the first images.

* * * * *